(12) United States Patent
Takahashi

(10) Patent No.: US 6,804,054 B2
(45) Date of Patent: Oct. 12, 2004

(54) COMPOSITE LENTICULAR LENS SHEET AND PROJECTION SCREEN

(75) Inventor: Katsunori Takahashi, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 0 days.

(21) Appl. No.: 10/415,403

(22) PCT Filed: Oct. 12, 2001

(86) PCT No.: PCT/JP01/08968
§ 371 (c)(1),
(2), (4) Date: Jun. 12, 2003

(87) PCT Pub. No.: WO02/37178
PCT Pub. Date: May 10, 2002

(65) Prior Publication Data
US 2004/0090674 A1 May 13, 2004

(30) Foreign Application Priority Data
Nov. 6, 2000 (JP) ........................................ 2000-337705

(51) Int. Cl.⁷ ........................... G03B 21/60; B29D 11/00
(52) U.S. Cl. ........................................ 359/457; 264/1.7
(58) Field of Search ................................ 359/455, 456, 359/457, 619, 620; 264/1.7, 2.6

(56) References Cited

U.S. PATENT DOCUMENTS

| | | | | |
|---|---|---|---|---|
| 5,104,435 A | * | 4/1992 | Oikawa et al. | 359/619 |
| 5,183,597 A | * | 2/1993 | Lu | 264/1.7 |
| 5,186,780 A | * | 2/1993 | Sakunaga et al. | 359/456 |
| 5,513,037 A | | 4/1996 | Yoshida et al. | 359/457 |
| 6,088,158 A | | 7/2000 | Kimura | 359/443 |
| 6,348,993 B1 | * | 2/2002 | Hori | 359/443 |
| 6,400,504 B2 | * | 6/2002 | Miyata | 359/457 |

FOREIGN PATENT DOCUMENTS

| | | |
|---|---|---|
| EP | 0997256 | 5/2000 |
| JP | 2000235230 | 8/2000 |

* cited by examiner

Primary Examiner—Christopher E Mahoney
(74) Attorney, Agent, or Firm—Ladas & Parry

(57) ABSTRACT

To provide a lenticular lens sheet where separation, or wrinkling or undulation is prevented from occurring in a manufacturing stage and a projection screen with the lenticular lens sheet. Constructed is a composite lenticular lens sheet that is disposed on a light-emission surface side of the Fresnel lens sheet and on the light-incidence surface side and on the light-emission surface side of that there are used respectively different plastic materials. In this composite lenticular lens sheet, the following assumption is made. Regarding the light emission surface side material, $Ta(°C.)$ represents the glass transition point; $Am(1/°C.)$ represents the coefficient of linear expansion at a temperature equal to or higher than Ta; and $As(1/°C.)$ represents the coefficient of linear expansion at a temperature equal to or lower than Ta, while, regarding the light-incidence surface side material, $Tb(°C.)$ represents the glass transition point; $Bm(1/C°)$ represents the coefficient of linear expansion at a temperature equal to or higher than Tb; and $Bs(1°/C)$ represents the coefficient of linear expansion at a temperature equal to or lower than Tb; and $Tx(°C.)$ represents a predetermined temperature equal to or higher than each of the Ta and Tb. Under this assumption that the light-emission surface side and light-incidence surface side materials are selected so that the following relations may hold true.
$(Tx-Ta)Am+(Ta-25)As > (Tx-Tb)Bm+(Tb-25)Bs$.

10 Claims, 5 Drawing Sheets

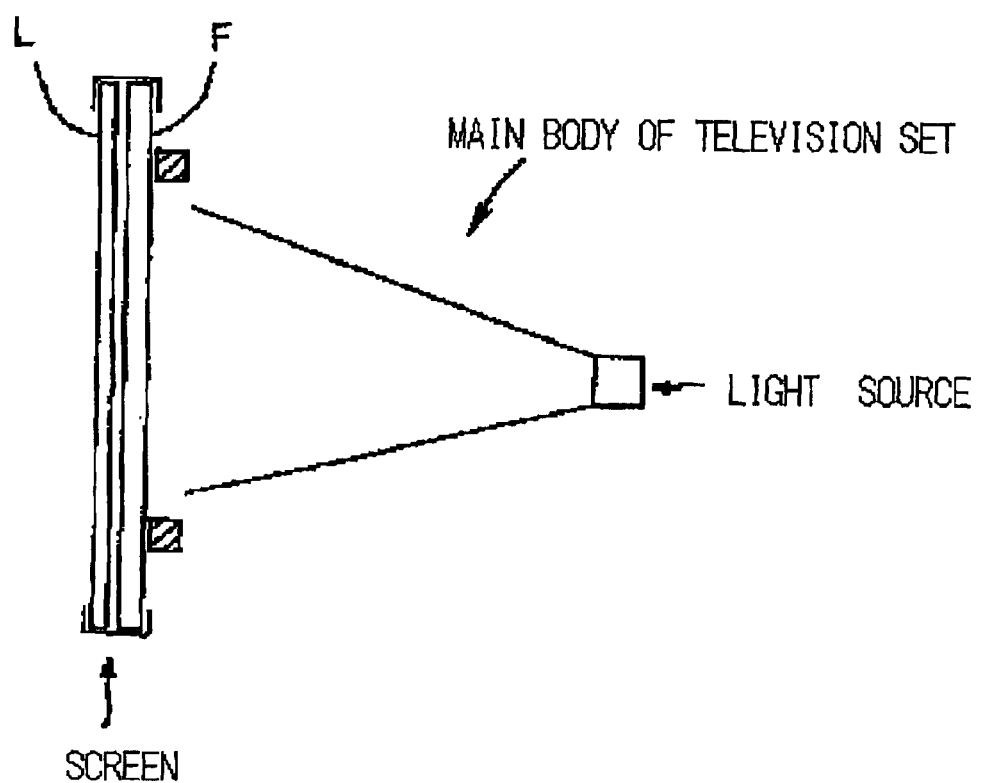

COMPOSITE LENTICULAR LENS SHEET AND PROJECTION SCREEN

TECHNICAL FIELD

The present invention relates to a lenticular lens sheet that is suitably used in combination with a Fresnel lens sheet and to a projection screen that is equipped with this lenticular lens sheet.

BACKGROUND ART

As illustrated in FIG. 4, in a projection screen on the light-incidence surface side and on the light-emission surface side, respectively, there are disposed a Fresnel lens sheet F and a lenticular lens sheet L. The Fresnel lens sheet is the one that has a base sheet having formed thereon a Fresnel lens by the use of a UV resin. For preventing the generation of a stray light (double image), the thickness thereof is made as small as 0.2 to 3.0 mm or so.

On the other hand, the lenticular lens sheet is a sheet the thickness of that is approximately 0.6 to 1.1 mm and on the surface of that a lenticular lens has been formed using an extrusion-molding technique.

The screen for that there is used a lens sheet having a relatively small thickness usually has a size as great as 40 to 80 inches. Therefore, between the lenticular lens sheet and the Fresnel lens sheet a separation, or wrinkles or undulations, are likely to occur. To prevent such phenomena, the following measures have been proposed. Namely, the measures to form the lenticular lens sheet into a configuration that is convex to the light-incidence surface side (Fresnel lens sheet side) (see FIG. 5(a)). And to bond it and the Fresnel lens sheet side together so as to cause the both to adhere to each other (see FIG. 5(b)). Japanese Patent Application Laid-Open No. 2000-235230 discloses a construction for realizing the above-described measures by using acrylic resin with high hygroscopic on the light-incidence surface side of the lenticular lens sheet.

However, humidity depends upon the surroundings of use of the projection screen. Therefore, there has been a demand for the settlement of the above-described problems in a stage before the stage in which such use is made.

DISCLOSURE OF THE INVENTION

Thereupon, it is the object of the present invention to provide a lenticular lens sheet that in the stage of manufacture can solve the above-described problems and a projection screen that is equipped with that lenticular lens sheet.

A transparent plastic material such as acrylic resin, PET resin, polystyrene resin, or polypropylene resin or the like necessarily has a peculiar glass transition point temperature (a temperature that when becoming higher than this temperature causes the material to start being fluidized) for each kind of the material. The present invention has been achieved by aiming at the fact that with that glass transition point temperature being set as a border the coefficients of linear expansion at temperatures higher or lower than that temperature remarkably change.

Hereafter, the present invention will be explained.

In a first aspect of the present invention, the above object is attained by a composite lenticular lens sheet that is disposed on a light-emission surface side of a Fresnel lens sheet and on a light-incidence surface side and on the light-emission surface side of that there are used respectively different plastic materials, the composite lenticular lens sheet being characterized in that, when it is assumed that, regarding the light-emission surface side material, $Ta(°C.)$ represents the glass transition point; $Am(1/°C.)$ represents the coefficient of linear expansion at a temperature equal to or higher than Ta; and $As(1/°C.)$ represents the coefficient of linear expansion at a temperature equal to or lower than Ta, while, regarding the light-incidence surface side material, $Tb(°C.)$ represents the glass transition point; $Bm(1/°C.)$ represents the coefficient of linear expansion at a temperature equal to or higher than Tb; and $Bs(1/°C.)$ represents the coefficient of linear expansion at a temperature equal to or lower than Tb; and when it is also assumed that $Tx(°C.)$ represents a predetermined temperature equal to or higher than each of the Ta and Tb, the light-emission surface side and light-incidence surface side materials are selected so that the following relationship may hold true.

$$(Tx-Ta)Am+(Ta-25)As > (Tx-Tb)Bm+(Tb-25)Bs$$

Here, regarding the coefficients of linear expansion Am, As of the light-emission surface side material as well as regarding the coefficients of linear expansion Bm, Bs of the light-incidence surface side material, the relevant explanation will be made with the following setting being made with regard to each coefficient of linear expansion that has dependency uppon temperatures. Namely, the corresponding temperature range is equally divided into 10 points (excluding the point at each end). And, said temperature-dependency coefficient of linear expansion value uses the arithmetic average value of the respective coefficient of linear expansion values at those 10 equally divided points temperatures.

According to the present invention, the light-emission surface side material and light-incidence surface side material that have been extruded in liquid forms, during a time period in which cooling is performed from the temperature Tx to normal temperature (25° C.), respectively, decrease (shrink) from the reference volume at the temperature Tx by the extent corresponding to amounts that are expressed as follows.

$$3((Tx-Ta)Am+(Ta-25)As)$$

$$3((Tx-Tb)Bm+(Tb-25)Bs)$$

Here, the reason why the coefficient "3" is added to each of the foremost portions of the volume terms is as follows. Namely, a cubic body the one-side length of that is "1" is considered as a reference and when the coefficient of liner expansion is X. Assuming that the temperature has risen by 1° C., the volume of this cubic body changes to $(1+X)^3 = 1+3X+3X^2+X^3$. However, because the coefficient X of linear expansion is sufficiently smaller than the value of "1", the term "$3X^2+X^3$" is a magnitude that is ignorable. Accordingly, the change in volume (the coefficient of volume expansion) relative to the change in temperature by 1° C. becomes 3×. That is, it becomes a value that is equal to approximately 3 times as great as the coefficient of linear expansion.

Accordingly, by selecting the light-emission surface side material and the light-incidence surface side material so that the following enequality may hold true, it is possible to make great the amount of shrinkage of the light-emission surface side material relative to the light-incidence surface side material during cooling.

$$(Tx-Ta)Am+(Ta-25)As > (Tx-Tb)Bm+(Tb-25)Bs$$

It is thereby possible to make the whole configuration of the composite lenticular lens sheet convex to the light-incidence surface side.

In a second aspect of the present invention, the above-described Tx may be a temperature that is obtained by adding a predetermined temperature to the temperature of (Ta+Tb)/2. Also, the predetermined temperature may be 5 to 85° C. Further, the Tx may be 150° C.

In this aspect, the Tx can be set at a temperature that is somewhat higher than each of the real transition point temperatures of the two kinds of materials. Therefore, even if the dependency upon the temperatures of each of the coefficients of linear expansion of the materials is high, these coefficients of linear expansion are almost not affected by that dependency. And during a time period in which cooling is performed from the temperature Tx to 25° C., it is possible to make great the amount of shrinkage of the light-emission surface side material relative to the light-incidence surface side material. Resultantly, it is possible to make the whole configuration of the composite lenticular lens sheet convex to the light-incidence surface side.

In a third aspect of the present invention, the above object is solved by providing a composite lenticular lens sheet that is characterized in that the light-emission surface side and light-incidence surface side materials are selected so that the following relationship may hold true.

$$(Tb-Ta)Am+(Ta-25)As > (Tb-25)Bs$$

If that composite lenticular lens sheet is provided like this, the light-emission surface side material and light-incidence surface side material that have been extruded in liquid states, during a time period in which cooling is performed from the temperature Tb to normal temperature (25° C.), respectively, decrease (shrink) from the reference volume at the temperature Tb by the extent corresponding to amounts that are expressed by the following value.

$$3((Tb-Ta)Am+(Ta-25)As)$$

and $$3(Tb-25)Bs$$

Accordingly, by selecting the light-emission surface side and light-incidence surface side materials so that the following relationship:

$$(Tb-Ta)Am+(Ta-25)As > (Tb-25)Bs$$

may hold true, it is possible to make great the amount of shrinkage of the light-emission surface side material relative to the light-incidence surface side material. Resultantly, it is possible to make the whole configuration of the composite lenticular lens sheet convex to the light-incidence surface side.

Also, in a fourth aspect of the present invention, the above object is solved by providing a composite lenticular lens sheet characterized in that the light-emission surface side and light-incidence surface side materials are selected so that the following relationship may hold true.

$$Ta < Tb$$

Also, in each of the first to the third aspect of the present invention, the light-emission surface side and light-incidence surface side materials may be selected so that the following relationship may hold true.

$$Ta < Tb$$

If providing the composite lenticular lens sheet like this, in the process of cooling, the light-incidence surface side material is first solidified and then the light-emission surface side material is solidified and shrunken to draw the light incidence surface side material toward it. Resultantly, it is possible to make the whole configuration of the composite lenticular lens sheet convex to the light-incidence surface side.

Further, the above-explained composite lenticular lens sheet can be disposed on the light emission side of the Fresnel lens sheet to thereby cause the both to adhere to each other. By doing so, it is possible to provide a projection screen that can prevent any separations from occurring between the lenticular lens sheet and the Fresnel lens sheet or can prevent any wrinkles or undulations from occurring on the surface of the lens sheet.

The above-described functions and advantages of the present invention will become apparent from the embodiments that will be explained next.

BRIEF DESCRIPTION OF THE DRAWINGS

FIG. 4 is a view illustrating a projection screen; and

BEST MODE FOR CARRYING OUT THE INVENTION

Figure 1:
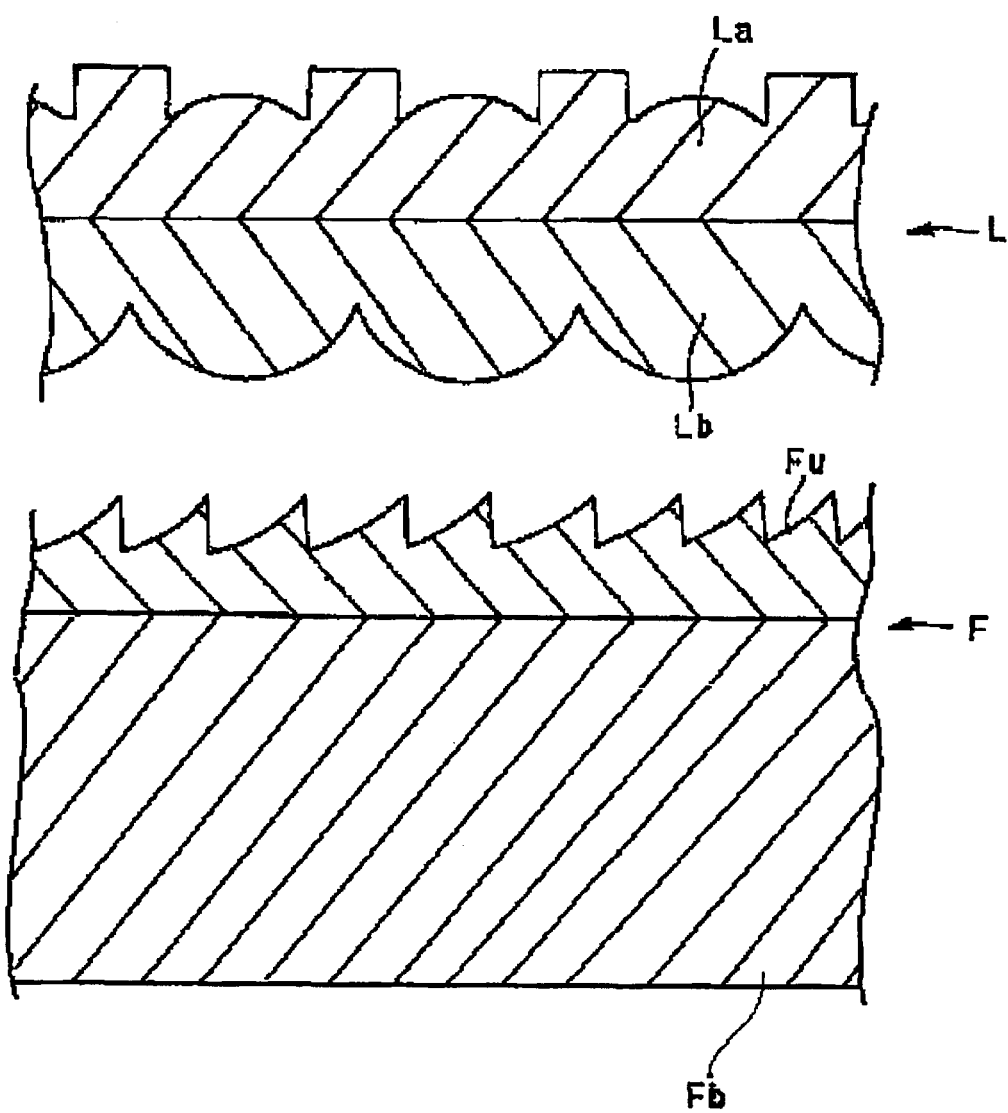
FIG. 1 is views illustrating partial cross sections of a lenticular lens sheet and Fresnel lens sheet.

The present invention will hereafter be explained on the basis of an embodiment illustrated in the drawings. FIG. 1 are partial sectional views each illustrating a lenticular lens sheet L and a Fresnel lens sheet F. In the projection sheet screen, the Fresnel lens sheet F and the lenticular lens sheet L are respectively disposed on a light-incidence surface side I and on a light-emission surface side O. The Fresnel lens sheet F is the one that has an acrylic base sheet Fb and has formed thereon a Fresnel lens layer Fu by the use of a UV resin of urethane acrylate system.

In the lenticular lens sheet L, a light-emission surface material La and a light-incidence surface material Lb are molded with use of a molding die so that a predetermined configuration of lenticular lens may be formed on each of the sheet surfaces. As the light-emission side material La and the light-incidence surface material Lb, transparent plastic materials are selected from the standpoint of their use purpose. Generally, because a transparent plastic material has a glass transition point, both the light-emission surface material La and the light-incidence surface material Lb have glass transition points Ta and Tb. Usually, the glass transition point of each of these transparent plastic materials is in the range of from 80 to 120° C.

When being extrusion-molded, each of those materials is heated up to a temperature of, for example, 250° C. or so and is extruded in the form of a liquid. Thereafter, it is rolled, and cooled, using an upper and lower two rolls each having a surface in which a lens-shaped female die has been formed. Thereby, a predetermined configuration of lens is formed on each surface. The surface temperature of the roll is maintained at a temperature of approximately 70° C. to 100° C.

The material that has passed through the roll part is then quenched by the air down to normal temperature.

Figure 2:
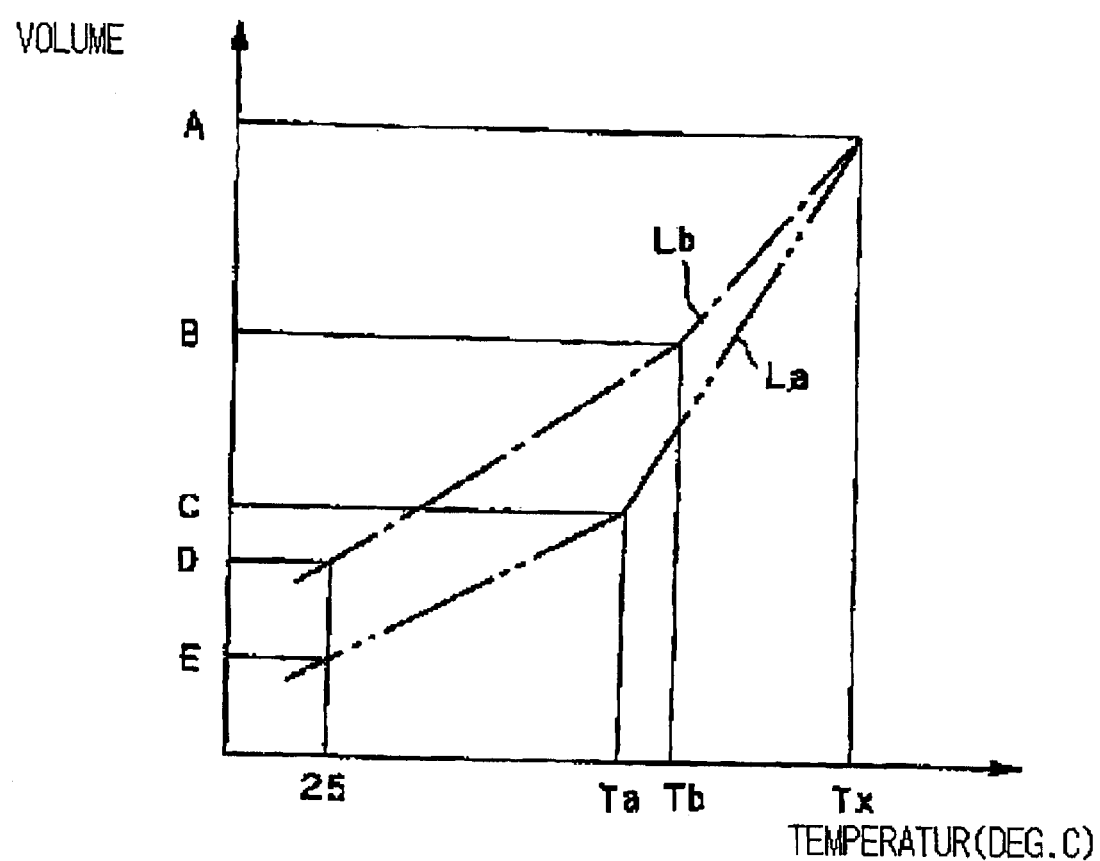
FIG. 2 is a view illustrating the relationship between the temperature and the volume of each of a material La and material Lb.

FIG. 2 is a view illustrating the relationship between the temperature and the volume in the case where each of the materials La and Lb is cooled from the temperature Tx down to normal temperature (25° C.). Here, with the volume (the point A in FIG. 2) of the materials La and Lb at the temperature of Tx being used as the reference, FIG. 2 illustrates the changes in the volume of the material La (indicated in a two-dot chain line in FIG. 2) and material Lb (indicated in a one-dot chain line in FIG. 2) in the process of being cooled.

The temperature Tx is the one which is somewhat higher than the respective glass transition points Ta and Tb of the light-emission surface side material La and the light-incidence surface side material Lb. As that temperature Tx there is assumed a temperature obtained by adding 5 to 85° C. to the temperature of (Ta+Tb)/2; preferably, a temperature obtained by adding 25 to 85° C. to it, or more preferably a temperature obtained by adding 45 to 65° C. to it. For example, in the case of the Ta is 90° C. and Tb is 100° C., the temperature of approximately 150° C. is assumed as Tx.

Now, there is considered, while referring to FIG. 2, the volumetric change in the case of cooling the light-incidence surface side material Lb from the temperature Tx to nomal temperature. Assume here that Bm represents the coefficient of linear expansion at a temperature higher than that corresponding to the glass transition point Tb of the light-incidence surface material Lb. Assume also that Bs represents the coefficient of linear expansion at a temperature lower than the Tb. During a time period from the temperature Tx to Tb the volume of the light-incidence surface material Lb shrinks by the extent corresponding to the length AB of FIG. 2. That amount of shrinkage, under the assumption that 1 represents the reference volume at the temperature Tx, corresponds approximately to an amount that is expressed as follows.

$$3(Tx-Tb)Bm$$

Subsequently, during a time period from the temperature Tb to normal temperature (25° C.) the volume of the light-incidence surface side material Lb shrinks by the extent corresponding to the length BD of FIG. 2. That amount of shrinkage, under the assumption that 1 represents the reference volume at the temperature Tx, corresponds approximately to an amount that is expressed as follows.

$$3(Tb-25)Bs$$

Accordingly, when the light-incidence surface material Lb is cooled from the temperature Tx to normal temperature (25° C.), the volume thereof shrinks by the extent corresponding to the length AD of FIG. 2. That amount of shrinkage, under the assumption that 1 represents the reference volume at the temperature Tx, corresponds approximately to an amount that is expressed as follows.

$$3(Tx-Tb)Bm+3(Tb-25)$$

Similarly, when the light-emission surface side material La is cooled from the temperature Tx to normal temperature (25° C.), the volume thereof shrinks by the extent corresponding to the length AE of FIG. 2. That amount of shrinkage, under the assumption that 1 represents the reference volume at the temperature Tx, corresponds approximately to an amount that is expressed as follows.

$$3(Tx-Ta)Am+3(Ta-25)As$$

Consider now the amounts of shrinkage of the light-emission surface side material La and the light-incidence surface side material Lb each of that is cooled from the temperature Tx to normal temperature. Assume that the amount of shrinkage of the former La exceeds the amount of shrinkage of the latter Lb. Then the lens sheet becomes convex with respect to the light-incidence surface side. Therefore, the object of the present invention is attained. This condition comes to the following conclusion when expressed in terms of the glass transition points of each material and the coefficients of linear expansion at the temperature corresponding those lower and higher than the glass transition point.

$$(Tx-Ta)Am+(Ta-25)As>(Tx-Tb)Bm+(Tb-25)Bs$$

Figure 3:
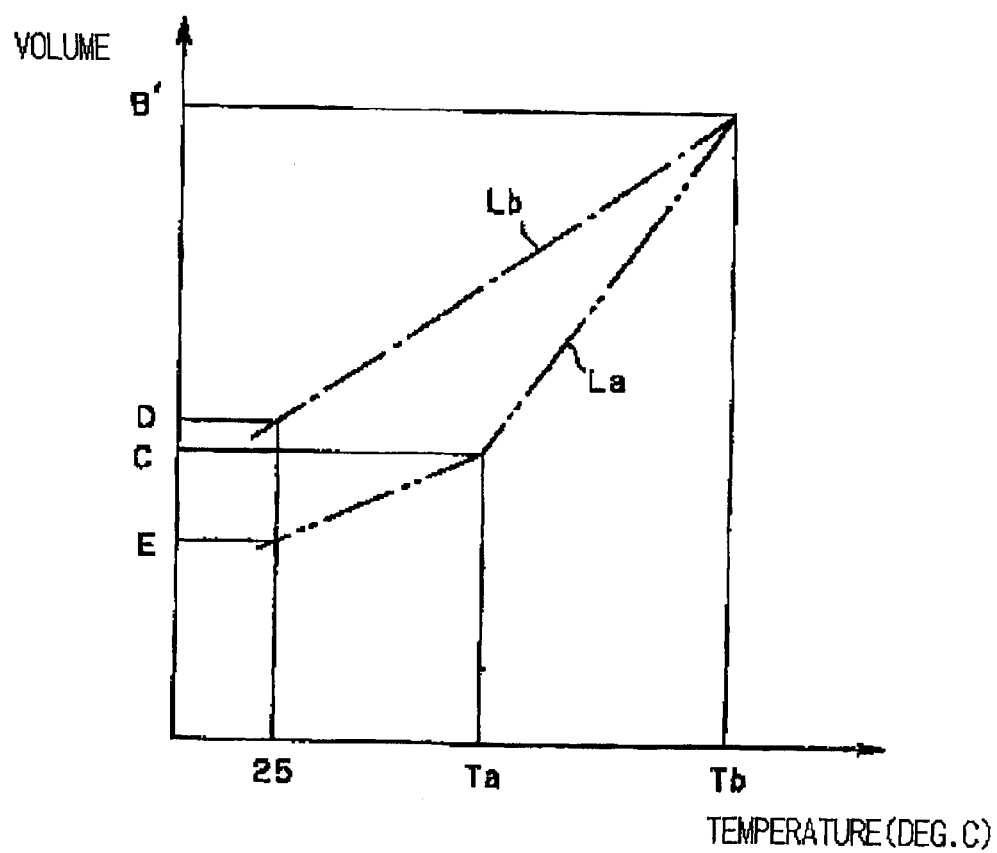
FIG. 3 is a view illustrating the relationship between the temperature and the volume of each of the material La and material Lb.
Figure 5A:
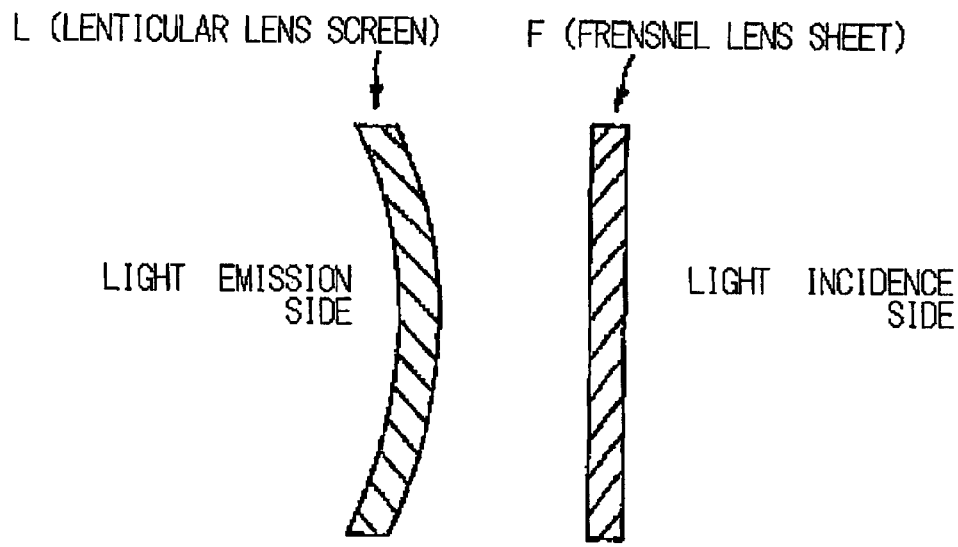
FIGS. 5(a) and 5(b) are views each illustrating the disposition of one of the lenticular lens relative to the Fresnel lens sheet.
Figure 5B:
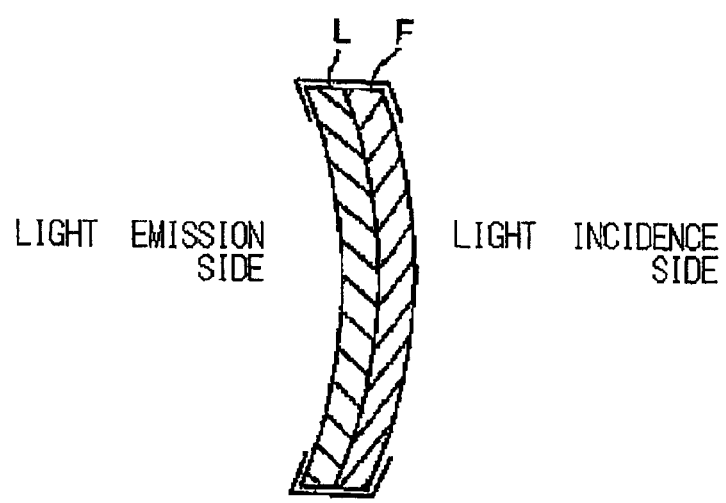

FIG. 3 is a view illustrating the relationship between the temperature and volume with the temperature Tx in FIG. 2 coinciding with the glass transition point Tb of the light-incidence surface side material Lb. Here, the volumes (the point B' in FIG. 3) of the material La and Lb at the temperature Tb are used as the reference and FIG. 3 illustrates the changes in the volumes of the material La (indicated in a two-dot chain line) and the material Lb (indicated in a one-dot chain line) in the process of being cooled from that temperature Tb.

Here, there is considered, while referring to FIG. 3, the volumetric change in the case of cooling the light-incidence surface side material Lb from the temperature Tb to normal temperature. Here as well, it is assumed that Bs represents the coefficient of linear expansion at a temperature lower than the glass transition point Tb of the light-incidence surface side material Lb. During a time period from the temperature Tb to normal temperature (25° C.) the volume of the light-incidence surface side material Lb shrinks by the extent corresponding to the length B'D in FIG. 3. That amount of shrinkage, under the assumption that 1 represents the reference volume at the temperature Tb, corresponds approximately to an amount that is expressed as follows.

$$3(Tb-25)Bs$$

On the other hand, when the light-emission surface side material La is cooled from the temperature Tb to normal temperature (25° C.), the volume thereof shrinks by the extent corresponding to the length B'E in FIG. 3. That amount of shrinkage, under the assumption that 1 represents the reference volume at the temperature Tb, corresponds approximately to an amount that is expressed as follows.

$$3(Tb-Ta)Am+3(Ta-25)As$$

Here as well, in the same way as were considered in connection with FIG. 2, there is considered the amounts of shrinkage of the light-emission surface side material La and light-incidence surface side material Lb that are cooled from the temperature Tb to normal temperature. Expressing the conditions, under that the amount of shrinkage of the light-emission surface side material La is greater than that of the light-incidence surface side material Lb; and as a result the lens sheet becomes convex to the light-incidence surface side, when expressed in terms of the glass transition points of each material and the coefficients of linear expansion at the temperature corresponding those lower and higher than the glass transition point, the following result is obtained.

$$(Tb-Ta)Am+(Ta-25)As>(Tb-25)Bs$$

Further, in the present invention, in parallel with, or independently from, the above-described conditions, it would also sufficiently serve the purpose even if selecting the light-emission surface side and light-incidence surface side material so that the relationship of Ta<Tb may hold true.

If so done, in the process of cooling, the light-incidence surface side material is first solidified and thereafter the light-emission surface side material is then solidified and shrinks to draw the light-incidence surface side material toward itself. Therefore, the whole configuration of the composite lenticular lens sheet can be made convex to the light-incidence surface side.

The present invention is not limited to the above-described embodiments. The invention can be suitably changed or modified without departing from the subject matter or technical ideas readable from the claims and the entire specification. Composite lenticular lens sheets and the resulting projection screens, following such changes or modifications, are also included in the technical scope of the present invention.

INDUSTRIAL APPLICABILITY

As has been described above, if selecting the light-emission surface side and light-incidence surface side materials so that the coefficients of linear expansion at the glass transition point and at temperatures before and after it may have a predetermined relationship, it is possible to obtain a composite lenticular lens sheet the configuration of that is convex to the light-incidence side. As a result of this, the thus-obtained lenticular lens sheet can be made to adhere to the Fresnel lens. In consequence, it is possible to prevent the components of the screen from being separated or prevent the screen from being wrinkled or undulated.

What is claimed is:

1. A composite lenticular lens sheet that is disposed on a light-emission surface side of a Fresnel lens sheet and on a light-incidence surface side and on a light-emission surface side of that there are respectively used different plastic materials, characterized in that, regarding the light-emission surface side material, $Ta(°C.)$ represents the glass transition point; $Am(1/°C.)$ represents the coefficient of linear expansion at a temperature equal to or higher than Ta; and $As(1/°C.)$ represents the coefficient of linear expansion at a temperature equal to or lower than Ta, while, regarding the light-incidence surface side material, $Tb(°C.)$ represents the glass transition point; $Bm(1/°C.)$ represents the coefficient of linear expansion at a temperature equal to or higher than Tb; and $Bs(1/°C.)$ represents the coefficient of linear expansion at a temperature equal to or lower than Tb; and that $Tx(°C.)$ represents a predetermined temperature equal to or higher than each of the Ta and Tb, the light-emission surface side and light-incidence surface side materials are selected to satisfy the following equation:

$$(Tx-Ta)Am+(Ta-25)As>(Tx-Tb)Bm+(Tb-25)Bs.$$

2. A composite lenticular lens sheet according to claim 1, characterized in that the Tx is a temperature obtained by adding a predetermined value of temperature to a temperature of $(Ta+Tb)/2$.

3. A composite lenticular lens sheet according to claim 2, characterized in that the Tx is a temperature obtained by adding a temperature of 5 to 85° C. to the temperature of $(Ta+Tb)/2$.

4. A composite lenticular lens sheet according to claim 1, characterized in that the Tx is a temperature of 150° C.

5. A composite lenticular lens sheet that is disposed on a light-emission surface side of a Fresnel lens sheet and on a light-incidence surface side and on a light-emission surface side of that there are respectively used different plastic materials, characterized in that, regarding the light-emission surface side material, $Ta(°C.)$ represents the glass transition point; $Am(1/°C.)$ represents the coefficient of linear expansion at a temperature equal to or higher than Ta; and $As(1/°C.)$ represents the coefficient of linear expansion at a temperature equal to or lower than Ta, while, regarding the light-incidence surface side material, $Tb(°C.)$ represents the glass transition point; $Bm(1/°C.)$ represents the coefficient of linear expansion at a temperature equal to or higher than Tb; and $Bs(1/°C.)$ represents the coefficient of linear expansion at a temperature equal to or lower than Tb, the light-emission surface side and light-incidence surface side materials are selected to satisfy the following equation:

$$(Tb-Ta)Am+(Ta-25)As>(Tb-25)Bs.$$

6. A composite lenticular lens sheet according to any one of claims 1 to 5, characterized in that further the light-emission surface side and light-incidence surface side materials are selected to satisfy the following equation:

$$Ta<Tb.$$

7. A projection screen which is equipped with the composite lenticular lens sheet according to any one of claims 1 to 5.

8. A composite lenticular lens sheet that is disposed on a light-emission surface side of a Fresnel lens sheet and on a light-incidence surface side and on a light-emission surface side of that there are respectively used different plastic materials, characterized in that, when $Ta(°C.)$ represents the glass transition point of the light-emission surface side material; and $Tb(°C.)$ represents the glass transition point of the light-incidence surface side material, the light-emission surface side and light-incidence surface side materials are selected to satisfy the following equation:

$$Ta<Tb.$$

9. A composite lenticular lens sheet that is disposed on a light-emission surface side of a Fresnel lens sheet and on a light-incidence surface side and on a light-emission surface side of that there are respectively used different plastic materials, characterized in that, regarding the light-emission surface side material, $Ta(°C.)$ represents the glass transition point; $Am(1/°C.)$ represents the coefficient of linear expansion at a temperature equal to or higher than Ta; and $As(1/°C.)$ represents the coefficient of linear expansion a: a temperature equal to or lower than Ta, while, regarding the light-incidence surface side materiel, $Tb(°C.)$ represents the glass transition point; $Bm(1/°C.)$ represents the coefficient of linear expansion at a temperature equal to or higher than Tb; and $Bs(1/°C.)$ represents the coefficient of linear expansion at a temperature equal to or lower than Tb; and that $Tx(°C.)$ represents a predetermined temperature equal to or higher than each of the Ta and Tb, the light-emission surface side and light-incidence surface side materials are selected to satisfy the following equation: $(Tx-Ta)Am+(Ta-25)As>(Tx-Tb)Bm+(Tb-25)Bs$, end the light-emission surface ski, and light-incidence surface side materials are selected to satisfy the following equation: $Ta<Tb$.

10. A projection screen which is equipped with the composite lenticular lens sheet that is disposed on a light-emission surface side of a Fresnel lens sheet and on a light-incidence surface side and on a light-emission surface side of that there are respectively used different plastic materials, characterized in that, regarding the light-emission surface side material, $Ta(°C.)$ represents the glass transition point; $Am(1/°C.)$ represents the coefficient of linear expansion at a temperature equal to or higher than Ta; and $As(1/°C.)$ represents the coefficient of linear expansion at a temperature equal to or lower than Ta, while, regarding the light-incidence surface side material, $Tb(°C.)$ represents the glass transition point; $Bm(1/°C.)$ represents the coefficient of linear expansion at a temperature equal to or higher then Tb; and $Bs(1/°C.)$ represents the coefficient of linear expansion at a temperature equal to or lower than Tb; and than $Tx(°C.)$ represents a predetermined temperature equal to or higher than each of the Ta and Tb, the light-emission surface side and light-incidence surface side materials are selected to satisfy the following equation: $(Tx-Ta)Am+(Ta-25)As>(Tx-Tb)Bm+(Tb-25)Bs$, and the light-emission surface side and light-incidence surface side materials are selected to satisfy the following equation:

$$Ta<Tb.$$

* * * * *